United States Patent
Gao

(10) Patent No.: US 10,833,802 B2
(45) Date of Patent: Nov. 10, 2020

(54) COMMUNICATION METHOD FOR ETHERNET PASSIVE OPTICAL NETWORK AND APPARATUS

(71) Applicant: HUAWEI TECHNOLOGIES CO., LTD., Shenzhen, Guangdong (CN)

(72) Inventor: Bo Gao, Wuhan (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/284,989

(22) Filed: Feb. 25, 2019

(65) Prior Publication Data

US 2019/0190650 A1 Jun. 20, 2019

Related U.S. Application Data

(63) Continuation of application No. PCT/CN2016/096956, filed on Aug. 26, 2016.

(51) Int. Cl.
*H04L 1/00* (2006.01)
*H04Q 11/00* (2006.01)

(52) U.S. Cl.
CPC .......... *H04L 1/0041* (2013.01); *H04L 1/0009* (2013.01); *H04L 1/0031* (2013.01);
(Continued)

(58) Field of Classification Search
CPC ... H04L 1/0009; H04L 1/0031; H04L 1/0041; H04L 1/0057; H04L 1/0075; H04Q 11/0067
(Continued)

(56) References Cited

U.S. PATENT DOCUMENTS 8,718,482 B1 * 5/2014 Roberts .................. H04B 10/27
398/102
9,450,705 B2 * 9/2016 Hirth ................... H03M 13/333
(Continued)

FOREIGN PATENT DOCUMENTS

| CN | 101795174 A | 8/2010 |
| CN | 104917564 A | 9/2015 |
| CN | 105610552 A | 5/2016 |

OTHER PUBLICATIONS

Yongcheng Li et al, Adaptive FEC-based lightpath routing and wavelength assignment in WDM optical networks. Optical Switching and Networking, 14(2014)241-249.

*Primary Examiner* — Amritbir K Sandhu
(74) *Attorney, Agent, or Firm* — Womble Bond Dickinson (US) LLP

(57) ABSTRACT

An optical line terminal or an optical network unit first obtains link communication quality of both a first physical link and a second physical link between the optical line terminal and the optical network unit, performs FEC encoding on the first physical link by using a first FEC code, and performs FEC encoding on the second physical link by using a second FEC code. The link communication quality of the first physical link is higher than that of the second physical link, and encoding performance of the second FEC code is higher than that of the first FEC code. Based on the foregoing technical solutions, a FEC encoding type may be selected flexibly based on communication quality of different physical links. FEC encoding having relatively low FEC encoding performance is used for a link in a good state, to reduce overheads, bandwidth, and energy consumption.

17 Claims, 3 Drawing Sheets

(52) U.S. Cl.
CPC .......... *H04L 1/0057* (2013.01); *H04L 1/0075* (2013.01); *H04Q 11/0067* (2013.01)

(58) Field of Classification Search
USPC ................................................ 398/202–214
See application file for complete search history.

(56) References Cited

U.S. PATENT DOCUMENTS

| | | | |
|---|---|---|---|
| 9,893,838 B2* | 2/2018 | Arunarthi | H04B 10/272 |
| 10,014,880 B2* | 7/2018 | Si | H04L 1/0046 |
| 2005/0149822 A1 | 7/2005 | Lee et al. | |
| 2008/0040643 A1* | 2/2008 | Effenberger | H04L 1/0057 |
| | | | 714/755 |
| 2010/0316381 A1 | 12/2010 | De Lind Van Wijngaarden | |
| 2011/0320905 A1* | 12/2011 | Lin | H04L 1/0041 |
| | | | 714/752 |
| 2013/0156420 A1* | 6/2013 | Amitai | H04B 10/5055 |
| | | | 398/27 |
| 2014/0181616 A1* | 6/2014 | Arunarthi | H04L 7/0337 |
| | | | 714/755 |
| 2014/0310579 A1 | 10/2014 | Hwang et al. | |

\* cited by examiner

COMMUNICATION METHOD FOR ETHERNET PASSIVE OPTICAL NETWORK AND APPARATUS

ROSS-REFERENCE T0RELATED APPLICATIONS

This application is a continuation of International Patent Application No. PCT/CN2016/096956, filed on Aug. 26, 2016, the disclosure of which is hereby incorporated by reference in its entirety.

TECHNICAL FIELD

The present invention relates to the field of communications technologies, and in particular, to a communication method for an Ethernet passive optical network (EPON) and a communications apparatus.

BACKGROUND

A passive optical network (PON) technology is one of the most widely used fiber to the home (FTTH) technologies at present. Existing PONs include a broadband passive optical network (BPON), a gigabit-capable passive optical network (GPON), an Ethernet passive optical network (EPON), and a 10 gigabit-capable passive optical network (XG-PON).

As shown in FIG. 1, a PON system mainly includes an optical line terminal (OLT), an optical network unit (ONU), and an optical distribution network (ODN), and the like. The ODN includes a feeder fiber, a passive splitter, and a distribution fiber. The OLT is connected to the passive splitter by using the feeder fiber. The splitter implements point-to-multipoint optical power distribution and is connected to a plurality of ONUs by using a plurality of distribution fibers. A direction from the OLT to the ONU is referred to as a downstream direction, and a direction from the ONU to the OLT is referred to as an upstream direction.

Technologies and standards related to an EPON have developed from IEEE 802.3 and are compatible with common ETH (Ethernet) technologies and devices, so that a large quantity of existing mature devices and circuits may be reused with low design risks, relatively mature technologies and industry chains, and low costs. Therefore, the Ethernet passive optical network is well received by telecommunications operators. In an EPON system, one optical line terminal communicates with a plurality of optical network units. To distinguish between different ONUs, each ONU needs to be provided with one logical link identifier (LLID) as an identifier of the ONU. If there are a plurality of logical links between the OLT and one ONU, a plurality of LLIDs are allocated to the ONU. The LLIDs separately initiate registration to the OLT and perform data communication with the OLT. Each LLID may be considered as a logical virtual ONU. When a plurality of ONUs send data to the OLT simultaneously, a signal conflict may be caused and normal transmission of data may be affected. Therefore, the OLT needs to coordinate transmission from ONUs by using a time slice license, to ensure that only one ONU is allowed to send data in one time period. This may effectively avoid conflicts. The Multi-Point Control Protocol (MPCP) is defined in an EPON standard, to implement ONU registration and control and coordinate different ONUs to share a PON in a manner of Time Division Multiple Access (TDMA) to send upstream data.

As shown in FIG. 2, only a downstream direction process is used as an example, and an upstream direction process is reversed. A process for processing to-be-sent data by a physical layer of an OLT or an ONU includes steps of performing 64b/66b encoding on the data, scrambling the data obtained after 64b/66b encoding, and performing forward error correction (Forward Error Correction, FEC) encoding on the scrambled data, and the like. A receiving side performs corresponding reverse processing, including operations of FEC (forward error correction) decoding, descrambling, and 64b/66b decoding, and the like.

For a 100 G (100 Gigabit) EPON system defined in IEEE 802.3ca, a minimum rate of a single lane (lane) is 25 G The 100 G EPON system needs to define FEC encoding having higher performance for the 25 G single lane, to satisfy power budget requirements. However, use of FEC encoding having high performance without discrimination means a waste of bandwidth resources.

SUMMARY

Embodiments of the present invention provide a communication method for an Ethernet passive optical network and a communications device. A FEC encoding type is adaptively selected based on link communication quality, to improve bandwidth resource utilization and avoid unnecessary waste.

According to a first aspect, a communication method for the Ethernet passive optical network is provided. An optical line terminal or an optical network unit first obtains link communication quality of both a first physical link and a second physical link between the optical line terminal and the optical network unit, performs FEC encoding on the first physical link by using a first FEC code, and performs FEC encoding on the second physical link by using a second FEC code. The link communication quality of the first physical link is higher than that of the second physical link, and encoding performance of the second FEC code is higher than that of the first FEC code.

In one embodiment, the performing FEC encoding on the first physical link by using a first FEC code, and performing FEC encoding on the second physical link by using a second FEC code includes:

receiving a FEC request to generate a control character, where the FEC request includes a first FEC encoding type or a second FEC encoding type, the control character includes a FEC encoding type and a delimiter, the FEC encoding type is used to identify whether the first FEC code or the second FEC code is used during FEC encoding, and the delimiter is used to identify a start delimiter or an end delimiter of a FEC codeword stream during FEC encoding;

forming one FEC codeword stream by using one or more Ethernet frames that use a same FEC encoding type;

performing 66-bit conversion on the control character to generate a 66-bit control code block, and placing at least one 66-bit control code block separately at a start position and an end position of one or more continuous FEC codeword streams to form a continuous code block stream having one or more FEC codewords.

In one embodiment, the FEC codeword includes a FEC payload and a check code, and the 66-bit control code block may be located before the first FEC codeword or the 66-bit control code block may be located after a check block of the last FEC codeword.

In one embodiment, the control character further includes FEC encoding switch information used to instruct whether to perform FEC encoding.

In one embodiment, the control character further includes information about a length of the FEC codeword stream, where the information about the length of the FEC codeword stream is used to assist in identifying a FEC codeword stream in a correct length.

In one embodiment, to ensure that the control character is presented in one 64-bit code block, before performing 66-bit conversion on the control character to generate a 66-bit control code block, the method further includes: regrouping a 32-bit codeword of an ordered-set control character that is of one of two 64-bit control codewords continuously received and that is in a clock cycle, and a 32-bit data codeword of the other 64-bit control codeword into a new 64-bit control codeword, and regrouping the remaining two 32-bit codewords into another new 64-bit control codeword.

In one embodiment, before performing 66-bit conversion on the control character to generate a 66-bit control code block, the method further includes: if a received control character is not aligned with an 8-byte boundary, inserting a redundant character to align the control character with the 8-byte boundary.

In one embodiment, FEC encoding is performed on the 66-bit control code block by using a third FEC code.

In one embodiment, the link communication quality includes but is not limited to a bit error rate, a packet loss rate, or a signal-to-noise ratio.

According to a second aspect, a communications device is provided, the device including:

an obtaining unit, configured to obtain link communication quality of both a first physical link and a second physical link between an optical line terminal and an optical network unit;

a first FEC encoding unit, configured to perform, based on the link communication quality of the first physical link, FEC encoding on the first physical link by using a first FEC code; and a second FEC encoding unit, configured to perform, based on the link communication quality of the second physical link, FEC encoding on the second physical link by using a second FEC code, where performance of the second FEC code is different from that of the first FEC code.

In one embodiment, the first FEC encoding unit and the second FEC encoding unit each specifically include:

a reconciliation sublayer, configured to receive a FEC request to generate a control character and send the control character to a physical coding sublayer, where the FEC request includes a first FEC encoding type or a second FEC encoding type, the control character includes a FEC encoding type and a delimiter, the FEC encoding type is used to identify whether the first FEC encoding type or the second FEC encoding type is used during FEC encoding performed by the physical coding sublayer, and the delimiter is used to identify a start delimiter or an end delimiter of a FEC codeword stream during FEC encoding performed by the physical coding sublayer;

the reconciliation sublayer forms one FEC codeword stream by using one or more Ethernet frames that use a same FEC encoding type and sends the FEC codeword stream to the physical coding sublayer; and the physical coding sublayer performs 66-bit conversion on the control character to generate a 66-bit control code block, and places at least one 66-bit control code block separately at a start position and an end position of one or more continuous FEC codeword streams to form a continuous code block stream having one or more FEC codewords.

In one embodiment, the FEC codeword includes a FEC payload and a check code, and the 66-bit control code block may be located before the first FEC codeword or the 66-bit control code block may be located after a check block of the last FEC codeword.

In one embodiment, the control character further includes FEC encoding switch information used to instruct the physical coding sublayer whether to perform FEC encoding.

With reference to any one of the second aspect or the possible implementations of the second aspect, in a fourth possible implementation of the communications device, the control character further includes information about a length of a FEC codeword stream, and the information about the length of the FEC codeword stream is used to assist the physical coding sublayer in identifying a FEC codeword stream in a correct length.

In one embodiment, to ensure that the control character sent by the reconciliation sublayer is presented in one 64-bit code block, a procedure before the physical coding sublayer performs 66-bit conversion on the control character to generate the 66-bit control code block includes: regrouping a 32-bit codeword of an ordered-set control character that is of one of two 64-bit control codewords continuously received and that is in a clock cycle, and a 32-bit data codeword of the other 64-bit control codeword into a new 64-bit control codeword, and regrouping the remaining two 32-bit codewords into another new 64-bit control codeword.

In one embodiment, if a received control character is not aligned with an 8-byte boundary, a redundant character is inserted to align the control character with the 8-byte boundary.

In one embodiment, FEC encoding is performed on the 66-bit control code block by using a third FEC code.

In one embodiment, the communications device is the optical line terminal or the optical network unit.

In one embodiment, the link communication quality includes a bit error rate, a packet loss rate, or a signal-to-noise ratio.

According to a third aspect, a communications device is further provided, the device including a processor, a memory, and a bus system, where the processor and the memory are connected by using the bus system, the memory is configured to store an instruction, and the processor is configured to execute the instruction stored in the memory, where the processor is configured to: obtain link communication quality of both a first physical link and a second physical link between an optical line terminal and an optical network unit; perform FEC encoding on the first physical link by using a first FEC code, and perform FEC encoding on the second physical link by using a second FEC code, where the link communication quality of the first physical link is higher than that of the second physical link, and encoding performance of the second FEC code is higher than that of the first FEC code.

In one embodiment, the processor is configured to: receive a FEC request to generate a control character, where the FEC request includes a first FEC encoding type or a second FEC encoding type, the control character includes a FEC encoding type and a delimiter, the FEC encoding type is used to identify whether the first FEC code or the second FEC code is used during FEC encoding performed by a physical coding sublayer, and the delimiter is used to identify a start delimiter or an end delimiter of a FEC codeword stream during FEC encoding performed by the physical coding sublayer; the reconciliation sublayer forms one FEC codeword stream by using one or more Ethernet frames that use a same FEC encoding type and sends the FEC codeword stream to the physical coding sublayer; and the physical coding sublayer performs 66-bit conversion on the control character to generate a 66-bit control code block, and places at least one 66-bit control code block separately at a start position and an end position of one or more continuous FEC codeword streams to form a continuous code block stream having one or more FEC codewords.

In one embodiment, the processor performs FEC encoding on the 66-bit control code block by using a third FEC code.

In one embodiment, the communications device is the optical line terminal or the optical network unit.

The embodiments of the present invention provide a communication method for an Ethernet passive optical network and a communications device. An optical line terminal or an optical network unit first obtains link communication quality of both a first physical link and a second physical link between the optical line terminal and the optical network unit, performs FEC encoding on the first physical link by using a first FEC code, and performs FEC encoding on the second physical link by using a second FEC code. The link communication quality of the first physical link is higher than that of the second physical link, and encoding performance of the second FEC code is higher than that of the first FEC code. Based on the foregoing technical solutions, a FEC encoding type may be selected flexibly based on communication quality of different physical links. FEC encoding having relatively low FEC encoding performance is used for a link in a good state, to reduce overheads, bandwidth, and energy consumption. FEC encoding having high FEC encoding performance is used for a link in a poor state, to ensure normal communication.

DESCRIPTION OF EMBODIMENTS

The following clearly and completely describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

According to the embodiments of the present invention, a flexible FEC selection solution is introduced into an EPON system. Because each physical link is different in link communication quality, different types of FEC encoding are used, and parameters of the link communication quality include but are not limited to a bit error rate, a packet loss rate, a signal-to-noise ratio, or the like. The link communication quality reflects link status. FEC encoding having relatively low FEC encoding performance is used for a link in a good state, to reduce overheads, bandwidth, and energy consumption. FEC encoding having high FEC encoding performance is used for a link in a poor state, to ensure normal communication. The FEC encoding performance is proportional to a bit error correction capability. A higher bit error correction capability indicates higher FEC encoding performance.

A plurality of codewords having various FEC encoding types may coexist in a data stream, or may include a packet not performing FEC encoding, so as to implement the flexible FEC encoding solution, improving bandwidth resource utilization and avoiding an unnecessary waste. This embodiment may be applied to both a downstream direction and an upstream direction.

In an EPON system, poor link communication quality may result in different cases, for example, an ONU cannot be found for a long time during initialization of an OLT, or registration cannot be performed when an ONU frequently goes online or offline or after an ONU goes offline. In this case, different types of FEC encoding need to be enabled or FEC encoding having a high performance level needs to be selected preferably. Certainly, when the ONU cannot receive expected authorization or has a high bit error rate during reception, different types of FEC encoding also need to be enabled or FEC encoding having a high performance level also needs to be selected preferably. Alternatively, during normal communication, it may be determined based on a bit error rate change trend whether to change FEC encoding between an OLT and an ONU in advance. This may realize coordination of FEC encoding. When the OLT is detecting an ONU, a delay timer may be started. If the delay timer times out, link communication quality assessment is performed, for example, checking a bit error rate, a packet loss rate, or a signal-to-noise ratio, or the like, to determine whether to enable a different type of FEC encoding.

Figure 1:
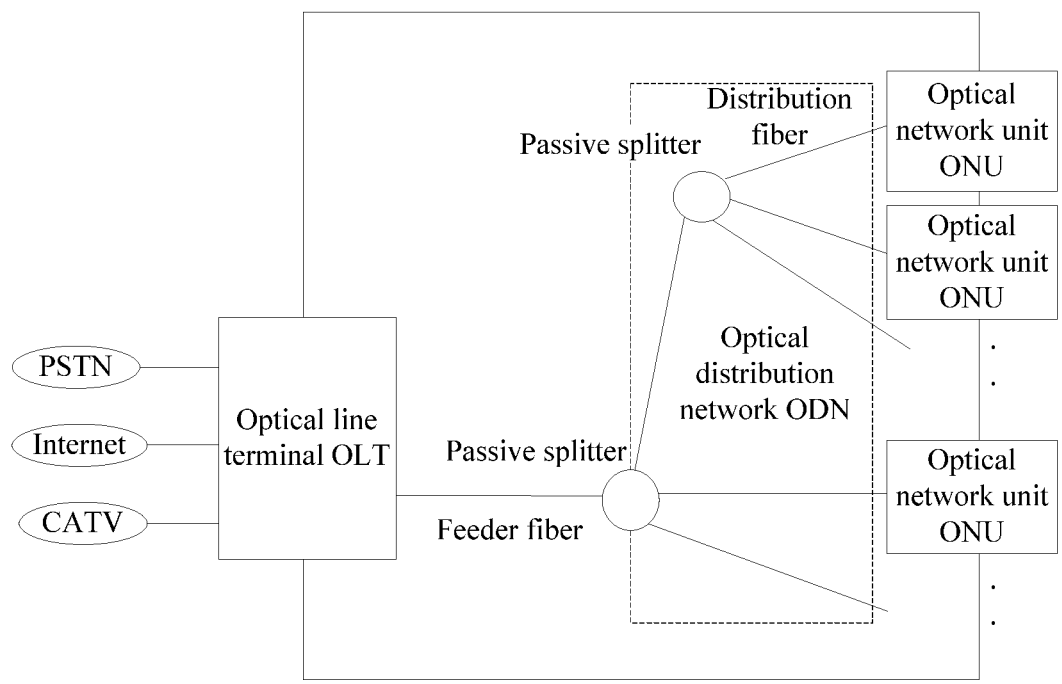
FIG. 1 is a schematic structural diagram of an EPON system.
Figure 2:
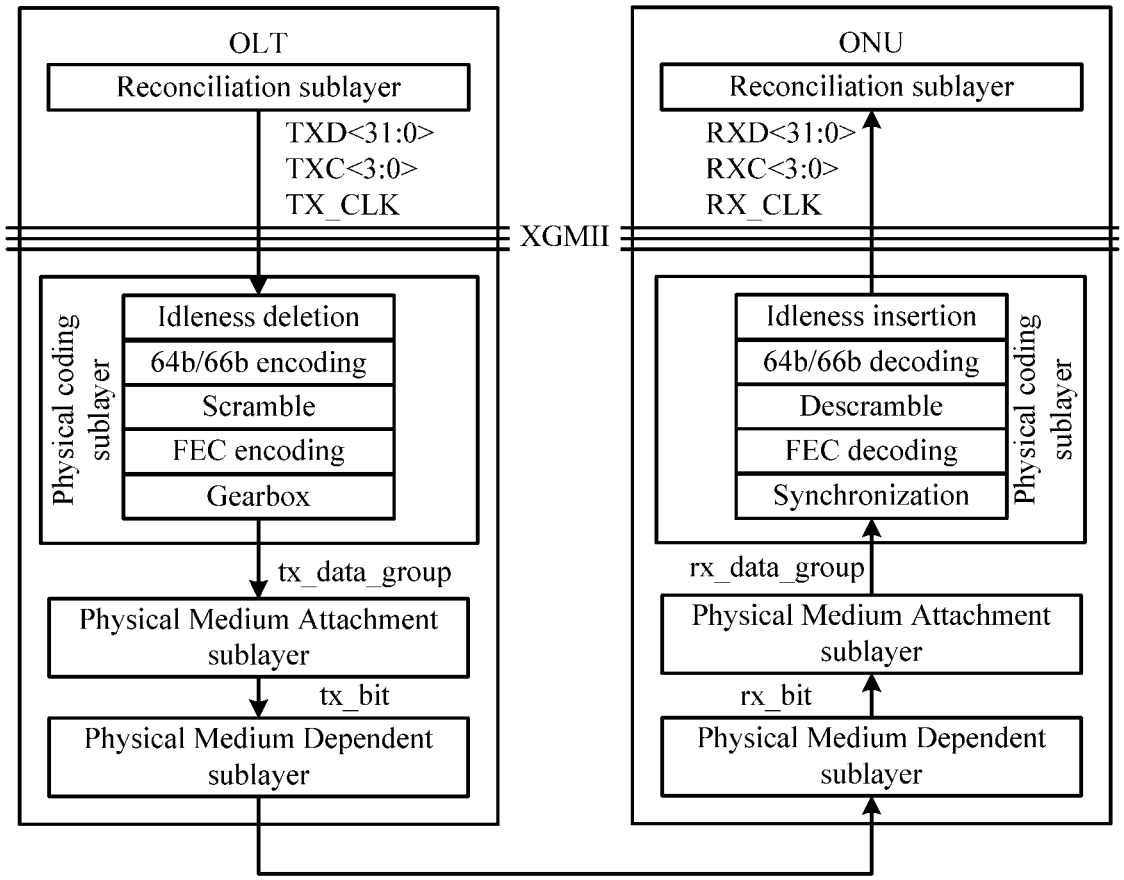
FIG. 2 is a flowchart of a downstream direction of a physical layer of an EPON system.
Figure 3:
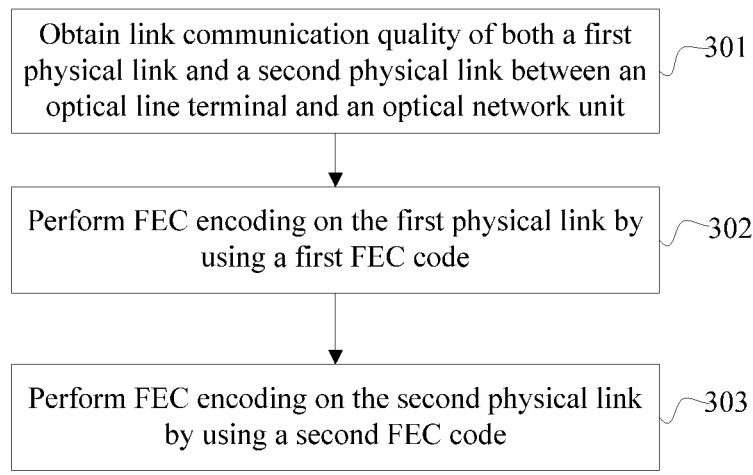
FIG. 3 is a flowchart of a communication method for an Ethernet passive optical network according to an embodiment of the present invention.

As shown in FIG. 3, a communication method for an Ethernet passive optical network according to an embodiment of the present invention includes the following operations:

Operation 301: An optical line terminal or an optical network unit obtains link communication quality of both a first physical link and a second physical link between the optical line terminal and the optical network unit.

Operation 302: Perform FEC encoding on the first physical link by using a first FEC code.

Operation 303: Perform FEC encoding on the second physical link by using a second FEC code.

The link communication quality of the first physical link is higher than that of the second physical link, and encoding performance of the second FEC code is higher than that of the first FEC code.

For specific implementations of operation 302 and operation 303, after receiving a FEC request, a reconciliation sublayer (RS) at a physical layer of the optical line terminal or the optical network unit generates a control character and sends the control character to a physical coding sublayer (PCS). The FEC request includes a first FEC encoding type or a second FEC encoding type. The control character includes a FEC encoding type and a delimiter. The FEC encoding type is used to identify whether the first FEC code or the second FEC code is used during FEC encoding performed by the physical coding sublayer. The delimiter is used to identify a start delimiter or an end delimiter of a FEC codeword stream during FEC encoding performed by the physical coding sublayer. The reconciliation sublayer forms one FEC codeword stream by using one or more Ethernet frames that use a same FEC encoding type and sends the FEC codeword stream to the physical coding sublayer. The physical coding sublayer performs 64b/66b encoding on the control character, to be specific, performs 66-bit conversion on the 64-bit control character to generate a 66-bit control code block according to coding rules and codeword mapping rules specified in the IEEE 802.3ae standard, to adjust an input data format, for ease of processing another module at the PCS layer. The 64b/66b encoding is applicable only to valid data, and not performed on a position to be filled with data. Table 1-1 is a 64b/66b encoding mapping table.

TABLE 1-1

| Input Data | Sync | Block Payload |
| --- | --- | --- |
|  |  | Bit Position: |

| Data Block Format: | | 0 1 | 2 | | | | | | | 65 |
| --- | --- | --- | --- | --- | --- | --- | --- | --- | --- | --- |
| $D_0 D_1 D_2 D_3/D_4 D_5 D_6 D_7$ | | 01 | $D_0$ | $D_1$ | $D_2$ | $D_3$ | $D_4$ | $D_5$ | $D_6$ | $D_7$ |

| Control Block Formats: | | Block Type Field | | | | | | | | |
| --- | --- | --- | --- | --- | --- | --- | --- | --- | --- | --- |
| $C_0 C_1 C_2 C_3/C_4 C_5 C_6 C_7$ | | 10 | 0 × 1e | $C_0$ | $C_1$ | $C_2$ | $C_3$ | $C_4$ | $C_5$ | $C_6$ | $C_7$ |
| $C_0 C_1 C_2 C_3/O_4 D_5 D_6 D_7$ | | 10 | 0 × 2d | $C_0$ | $C_1$ | $C_2$ | $C_3$ | $D_4$ | $D_5$ | $D_6$ | $D_7$ |
| $C_0 C_1 C_2 C_3/S_4 D_5 D_6 D_7$ | | 10 | 0 × 33 | $C_0$ | $C_1$ | $C_2$ | $C_3$ | ||| | $D_5$ | $D_6$ | $D_7$ |
| $O_0 D_1 D_2 D_3/S_4 D_5 D_6 D_7$ | | 10 | 0 × 66 | $D_1$ | $D_2$ | $D_3$ | $O_0$ | ||| | $D_5$ | $D_6$ | $D_7$ |
| $O_0 D_1 D_2 D_3/O_4 D_5 D_6 D_7$ | | 10 | 0 × 55 | $D_1$ | $D_2$ | $D_3$ | $O_0$ | $O_4$ | $D_5$ | $D_6$ | $D_7$ |
| $S_0 D_1 D_2 D_3/D_4 D_5 D_6 D_7$ | | 10 | 0 × 78 | $D_1$ | $D_2$ | $D_3$ | | $D_4$ | $D_5$ | $D_6$ | $D_7$ |
| $O_0 D_1 D_2 D_3/D_4 C_5 C_6 C_7$ | | 10 | 0 × 4b | $D_1$ | $D_2$ | $D_3$ | $O_0$ | $C_4$ | $C_5$ | $C_6$ | $C_7$ |
| $T_0 C_1 C_2 C_3/C_4 C_5 C_6 C_7$ | | 10 | 0 × 87 | |||||| | $C_1$ | $C_2$ | $C_3$ | $C_4$ | $C_5$ | $C_6$ | $C_7$ |
| $D_0 T_1 C_2 C_3/C_4 C_5 C_6 C_7$ | | 10 | 0 × 99 | $D_0$ | ||||| | $C_2$ | $C_3$ | $C_4$ | $C_5$ | $C_6$ | $C_7$ |
| $D_0 D_1 T_2 C_3/C_4 C_5 C_6 C_7$ | | 10 | 0 × aa | $D_0$ | $D_1$ | |||| | $C_3$ | $C_4$ | $C_5$ | $C_6$ | $C_7$ |
| $D_0 D_1 D_2 T_3/C_4 C_5 C_6 C_7$ | | 10 | 0 × b4 | $D_0$ | $D_1$ | $D_2$ | ||| | $C_4$ | $C_5$ | $C_6$ | $C_7$ |
| $D_0 D_1 D_2 D_3/T_4 C_5 C_6 C_7$ | | 10 | 0 × cc | $D_0$ | $D_1$ | $D_2$ | $D_3$ | || | $C_5$ | $C_6$ | $C_7$ |
| $D_0 D_1 D_2 D_3/D_4 T_5 C_6 C_7$ | | 10 | 0 × d2 | $D_0$ | $D_1$ | $D_2$ | $D_3$ | $D_4$ | | | $C_6$ | $C_7$ |
| $D_0 D_1 D_2 D_3/D_4 D_5 T_6 C_7$ | | 10 | 0 × e2 | $D_0$ | $D_1$ | $D_2$ | $D_3$ | $D_4$ | $D_5$ | | | $C_7$ |
| $D_0 D_1 D_2 D_3/D_4 D_5 D_6 T_7$ | | 10 | 0 × ff | $D_0$ | $D_1$ | $D_2$ | $D_3$ | $D_4$ | $D_5$ | $D_5$ | $D_6$ | code block, and places at least one 66-bit control code block separately at a start position and an end position of one or more continuous FEC codeword streams to form a continuous code block stream having one or more FEC codewords.

In another embodiment, the FEC codeword further includes a FEC payload and a check code, and the 66-bit control code block may be located before the first FEC codeword or the 66-bit control code block may be located after a check block of the last FEC codeword.

In another embodiment, the control character further includes FEC encoding switch information used to instruct the physical coding sublayer whether to perform FEC coding.

In another embodiment, the control character further includes information about a length of a FEC codeword stream, and the information about the length of the FEC codeword stream is used to assist the physical coding sublayer in identifying a FEC codeword stream in a correct length.

Figure 4:
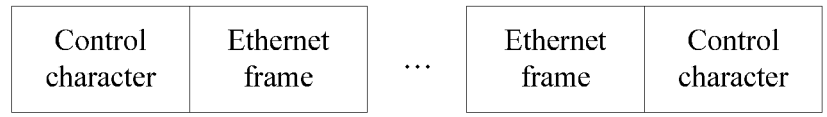
FIG. 4 is a schematic structural diagram of a control character and an Ethernet frame according to an embodiment of the present invention.

As shown in FIG. 4, a FEC codeword frame structure includes a control character S_FEC at a start position, a preamble, one or more Ethernet frames ETH using a same FEC encoding type, a check code PARITY, and a control character T_FEC at an end position. It should be noted that, in this embodiment, both the control blocks S_FEC and T_FEC are not a part of the FEC codeword, and therefore not to be FEC encoded or scrambled. A receiving side only needs to perform FEC codeword delimitation based on the control blocks S_FEC and T_FEC, to determine whether to perform FEC decoding or to perform corresponding FEC decoding based on a FEC encoding type indicated by the control blocks S_FEC and T_FEC.

The 64b/66b encoding is a key part in the PCS. A process includes: encoding a 64-bit control code into a 66-bit control code block according to coding rules and codeword mapping rules specified in the IEEE 802.3ae standard, to adjust an input data format, for ease of processing another module at the PCS layer. The 64b/66b encoding is applicable only to valid data, and not performed on a position to be filled with data. Table 1-1 is a 64b/66b encoding mapping table.

The mapping table 1-1 is defined and explained in detail in IEEE 802.3, and details are not described herein.

In one embodiment, to ensure that the control character sent by the RS is presented in one 64-bit code block, before the physical coding sublayer performs 66-bit conversion on the control character to generate the 66-bit control code block, the method further includes: regrouping a 32-bit codeword of an ordered-set control character (O) that is of one of two 64-bit control codewords continuously received and that is in a clock cycle, and a 32-bit data codeword (D) of the other 64-bit control codeword into a new 64-bit control codeword, and regrouping the remaining two 32-bit codewords into another new 64-bit control codeword. In another easier manner, if a received control character is not aligned with an 8-byte boundary, a redundant character is inserted to align the control character with the 8-byte boundary, so that the control character can be in one 66-bit code block when the physical coding sublayer performs FEC encoding subsequently. For example, when a signal X0X1X2X3/A4D5D6D7+D0D1D2D3/S4D5D6D7 is received from the RS, the signal is converted into A0D1D2D3/D4D5D6D7+X0X1X2X3/S4D5D6D7 by adjusting a sequence; or a redundant character /I/ is inserted to convert the signal into X0X1X2X3/C4C5C6C7+A0D1D2D3/D4D5D6D7+C0C1C2C3/S4D5D6D7. In another manner, for example, when a signal T0C1C2C3/B4D5D6D7+D0D1D2D3/C4C5C6C7 is received from the RS, the signal is converted into T0C1C2C3/C4C5C6C7+B0D1D2D3/D4D5D6D7 by adjusting a sequence; or a redundant character /I/ is inserted to convert the signal into T0C1C2C3/C4C5C6C7+B0D1D2D3/D4D5D6D7+C0C1C2C3/C4C5C6C7.

To ensure that a FEC codeword delimiter and a FEC encoding type identifier can be correctly identified when a bit error rate is high, another type of FEC encoding like a third FEC encoding type may be used to independently protect valid information in S_FEC and T_FEC, and a generated check bit may be used as a part of the 66-bit control code block. S_FEC or T_FEC may be denoted by using only one 66-bit control code block, or may be extended to a sequence formed by a plurality of continuous 66-bit control code blocks, and a length of the sequence specifically depends on a length of the check code. Encoding performance of the third FEC code is different from that of the first FEC code and the second FEC code.

Based on the foregoing technical solutions, a FEC encoding type may be selected flexibly based on communication quality of different physical links. FEC encoding having relatively low FEC encoding performance is used for a link in a good state, to reduce overheads, bandwidth, and energy consumption. FEC encoding having high FEC encoding performance is used for a link in a poor state, to ensure normal communication.

The following describes several implementations of the control code in detail according to certain embodiments.

Implementation 1: The control character is obtained by extending an ordered set (Sequence), and a specific format of the extended ordered set is as follows.

| Sequence (0x9c) | FEC | SW | Type | LEN | 0x00 | 0x00 | 0x00 |
|---|---|---|---|---|---|---|---|

Type=0x04 indicates that the ordered set is used as a start delimiter of FEC codeword information bits.

Type=0x05 indicates that the ordered set is used as an end delimiter of FEC codeword information bits.

FEC=0x00 indicates reservation or that FEC encoding is not performed.

FEC=0x01 indicates that RS (255, 223) encoding is used.

FEC=0x02 indicates that an LDPC or FEC encoding having higher performance is used.

Optionally, SW=0 indicates that FEC encoding is disabled, and SW=1 indicates that FEC encoding is enabled.

LEN indicates a field of a codeword length, and the field may assist the PCS layer in identifying a correct length of a FEC codeword.

Positions and values of Type, FEC, SW, and LEN may be in other forms, and are not limited to the foregoing examples. For ease of subsequent description, a mnemonic symbol O0D1D2D3/D4D5D6D7 may be specified to identify the ordered set.

Implementation 2: The control block is obtained by extending a control code (Control), and a specific format is as follows.

| Control | FEC | SW | LEN | 0x00 | 0x00 | 0x00 | 0x00 |
|---|---|---|---|---|---|---|---|

Control=0xEB is used as a start delimiter of FEC codeword information bits.

Control=0xED is used as an end delimiter of FEC codeword information bits.

FEC=0x00 indicates reservation or that FEC encoding is not performed.

FEC=0x01 indicates that RS (255, 223) encoding is used.

FEC=0x02 indicates that an LDPC or FEC encoding having higher performance is used.

Optionally, SW=0 indicates that FEC encoding is disabled, and SW=1 indicates that FEC encoding is enabled.

LEN indicates a field of a codeword length, and the field may assist the PCS layer in identifying a correct length of a FEC codeword.

Positions and values of Type, FEC, SW, and LEN may be in other forms, and are not limited to the foregoing examples.

For ease of subsequent description, a mnemonic symbol A0D1D2D3/D4D5D6D7 may be specified to denote a control code of the start delimiter, and B0D1D2D3/D4D5D6D7 may be specified to denote a control code of the end delimiter.

A format of the control character in a third form is as follows.

| 10 | BlockType | FEC | SW | Type | O0 | LEN |
|---|---|---|---|---|---|---|

BlockType denotes a code block type, FEC denotes a field of a FEC encoding type, SW denotes a FEC switch field, Type denotes whether the code block is a start delimiter or an end delimiter, and LEN denotes a field of a FEC codeword length. To reduce an erroneous synchronization probability, the receiving side may match a control block of the FEC end delimiter based on the FEC codeword length indicated by the field.

A format of the control character in a fourth form is as follows.

| 10 | BlockType | FEC | SW | LEN | 0x00 | 0x00 | 0x00 | 0x00 |
|---|---|---|---|---|---|---|---|---|

When a value of BlockType is 0x1f, it indicates A0D1D2D3/D4D5D6D7. When a value of BlockType is 0x20, it indicates B0D1D2D3/D4D5D6D7.

FEC denotes a field of a FEC encoding type, SW denotes a FEC switch field, and LEN denotes a field of a FEC codeword length. To reduce an erroneous synchronization probability, the receiving side may match a control block of the FEC end delimiter based on the FEC codeword length indicated by the field.

In another embodiment, to ensure that a receiver can effectively make a decision and restore a clock, a special value may be used for the FEC field, and the value should include enough changes in 0 and 1. For example:

| 10 | 0x90 | 0x76 | 0x47 | 0xf0 | 0x0f | 0x6f | 0x89 | 0xb8 |
|---|---|---|---|---|---|---|---|---|

It indicates that FEC is disabled.

| 10 | 0xc4 | 0xe6 | 0xc5 | 0x65 | 0x3a | 0x9a | 0x3b | 0x19 |
|---|---|---|---|---|---|---|---|---|

It indicates that RS (255, 223) is used.

| 10 | 0x9b | 0xa2 | 0x79 | 0x3d | 0x64 | 0x5b | 0x86 | 0xc2 |
|---|---|---|---|---|---|---|---|---|

It indicates that a low-density parity-check code (Low Density Parity Check Code, LDPC) or FEC encoding having higher performance is used.

Figure 5:
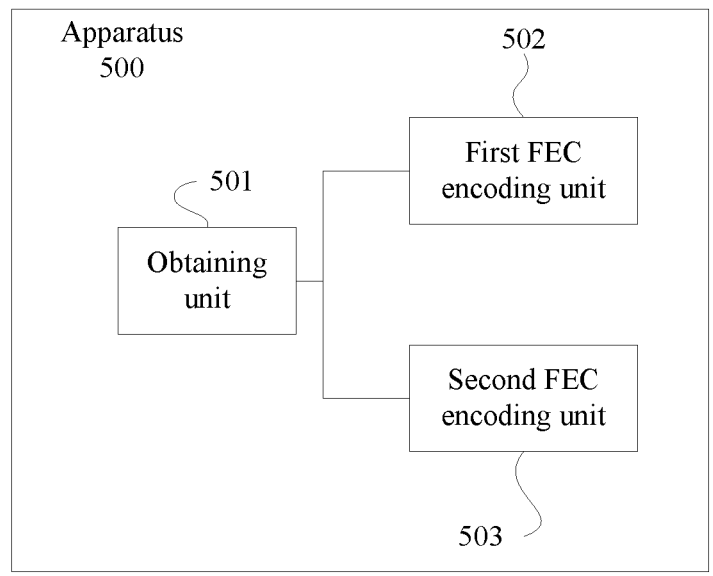
FIG. 5 is a schematic structural diagram of a communications device according to an embodiment of the present invention.

As shown in FIG. 5, an embodiment of the present invention further provides a communications device 500. The communications device 500 may be an optical line terminal or an optical network unit. The device includes:

an obtaining unit 501, configured to obtain link communication quality of both a first physical link and a second physical link between the optical line terminal and the optical network unit;

a first FEC encoding unit 502, configured to perform FEC encoding on the first physical link by using a first FEC code; and a second FEC encoding unit 503, configured to perform FEC encoding on the second physical link by using a second FEC code, where the link communication quality of the first physical link is higher than that of the second physical link, and encoding performance of the second FEC code is higher than that of the first FEC code.

In this embodiment, the first FEC encoding unit and the second FEC encoding unit each include:

a reconciliation sublayer, configured to receive a FEC request to generate a control character and send the control character to a physical coding sublayer PCS, where the FEC request includes a first FEC encoding type or a second FEC encoding type, the control character includes a FEC encoding type and a delimiter, the FEC encoding type is used to identify whether the first FEC encoding type or the second FEC encoding type is used during FEC encoding performed by the physical coding sublayer, and the delimiter is used to identify a start delimiter or an end delimiter of a FEC codeword stream during FEC encoding performed by the physical coding sublayer. The reconciliation sublayer forms one FEC codeword stream by using one or more Ethernet frames that use a same FEC encoding type and sends the FEC codeword stream to the physical coding sublayer. The physical coding sublayer performs 66-bit conversion on a 64-bit code block of the control character to generate a 66-bit control code block, and places at least one 66-bit control code block separately at a start position and an end position of one or more continuous FEC codeword streams to form a continuous code block stream having one or more FEC codewords.

It should be emphasized that the first FEC encoding unit 502 and the second FEC encoding unit 503 may be one FEC encoding unit that performs two different types of FEC encoding.

In one embodiment, a 66-bit control code block is placed before the first FEC codeword and one 66-bit control code block is placed after the last FEC codeword (or a check code of the last codeword). In a possible implementation, the control character further includes FEC encoding switch information used to instruct the physical coding sublayer whether to perform FEC encoding. In a possible implementation, the control character further includes information about a length of the FEC codeword stream, where the information about the length of the FEC codeword stream is used to assist the physical coding sublayer in identifying a FEC codeword stream in a correct length.

In one embodiment, a procedure before the physical coding sublayer performs 66-bit conversion on the control character to generate the 66-bit control code block further includes: regrouping a 32-bit codeword of an ordered-set control character that is of one of two 64-bit control codewords continuously received and that is in a clock cycle, and a 32-bit data codeword of the other 64-bit control codeword into a new 64-bit control codeword, and regrouping the remaining two 32-bit codewords into another new 64-bit control codeword.

In one embodiment, to ensure that a FEC codeword delimiter and a FEC encoding type identifier can be correctly identified when a bit error rate is high, another type of FEC encoding like a third FEC encoding type may be used to protect valid information in S_FEC and T_FEC, and a generated check bit may be used as a part of the 66-bit control code block. S_FEC or T_FEC may be denoted by using only one 66-bit control code block, or may be extended to a sequence formed by a plurality of continuous 66-bit control code blocks, and a length of the sequence specifically depends on a length of the check code. Encoding performance of the third FEC code is different from that of the first FEC code and the second FEC code.

FIG. 5 is the schematic structural diagram of the communications device according to this embodiment of the present invention. It may be understood that the communications device shown in FIG. 5 is merely an example. The communications device in this embodiment of the present invention may further include another module or unit, or include modules having functions similar to those of the modules in FIG. 5, or may not include all modules in FIG. 5.

Based on the foregoing technical solutions, a FEC encoding type may be selected flexibly based on communication quality of different physical links. FEC encoding having relatively low FEC encoding performance is used for a link in a good state, to reduce overheads, bandwidth, and energy consumption. FEC encoding having high FEC encoding performance is used for a link in a poor state, to ensure normal communication.

Figure 6:
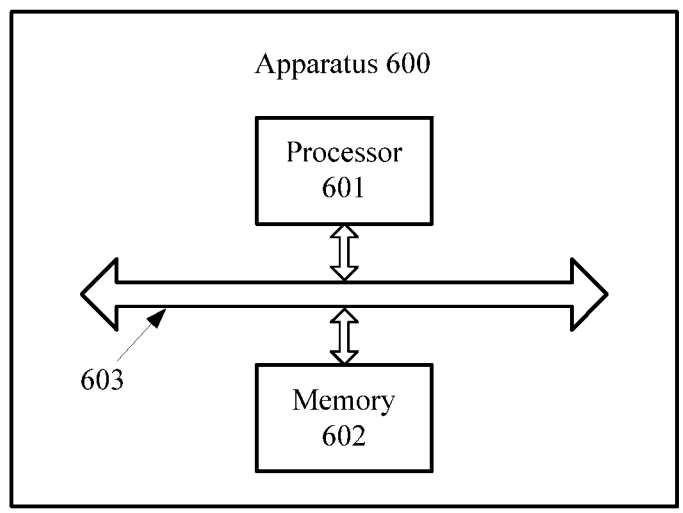
FIG. 6 is a schematic structural diagram of another communications device according to an embodiment of the present invention.

As shown in FIG. 6, an embodiment of the present invention further provides a communications device 600. The communications device 600 may be an optical line terminal or an optical network unit. The device 600 includes a processor 601, a memory 602, and a bus system 603. The processor 601 and the memory 602 are connected by the bus system 603. The memory 602 is configured to store an instruction. When the processor 601 executes a program stored in the memory 602, the processor 601 is specifically configured to: obtain link communication quality of both a first physical link and a second physical link between the optical line terminal and the optical network unit; perform FEC encoding on the first physical link by using a first FEC code; and perform FEC encoding on the second physical link by using a second FEC code, where the link communication quality of the first physical link is higher than that of the second physical link, and encoding performance of the second FEC code is higher than that of the first FEC code.

In one embodiment, the processor 601 is specifically configured to: receive a FEC request to generate a control character, where the FEC request includes a first FEC encoding type or a second FEC encoding type, the control character includes a FEC encoding type and a delimiter, the FEC encoding type is used to identify whether the first FEC code or the second FEC code is used during FEC encoding performed by a physical coding sublayer, and the delimiter is used to identify a start delimiter or an end delimiter of a FEC codeword stream during FEC encoding performed by the PCS. The reconciliation sublayer forms one FEC codeword stream by using one or more Ethernet frames that use a same FEC encoding type and sends the FEC codeword stream to the physical coding sublayer. The physical coding sublayer performs 66-bit conversion on the control character to generate a 66-bit control code block, and places at least one 66-bit control code block separately at a start position and an end position of one or more continuous FEC codeword streams to form a continuous code block stream having one or more FEC codewords.

In another embodiment, to ensure that a FEC codeword delimiter and a FEC encoding type identifier can be correctly identified when a bit error rate is high, the processor

601 may use another type of FEC encoding like a third FEC encoding type to protect valid information in S_FEC and T_FEC, and a generated check bit may be used as a part of a 66-bit control code block. S_FEC or T_FEC may be denoted by using only one 66-bit control code block, or may be extended to a sequence formed by a plurality of continuous 66-bit control code blocks, and a length of the sequence specifically depends on a length of the check code. Encoding performance of the third FEC code is different from that of the first FEC code and the second FEC code.

The communications device 600 may perform some or all operations in the method shown in FIG. 3. For brevity, details are not described herein again.

Based on the foregoing technical solutions, a FEC encoding type may be selected flexibly based on communication quality of different physical links. FEC encoding having relatively low FEC encoding performance is used for a link in a good state, to reduce overheads, bandwidth, and energy consumption. FEC encoding having high FEC encoding performance is used for a link in a poor state, to ensure normal communication.

It should be understood that in this embodiment of the present invention, the processor may be a central processing unit ("CPU" for short), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor, or the like.

The memory may include a read-only memory and a random access memory, and provide an instruction and data to the processor. A part of the memory may further include a non-volatile random access memory. For example, the memory may further store information about a device type.

The bus system may further include a power bus, a control bus, a status signal bus, and the like, in addition to a data bus. However, for clear description, various types of buses in the figure are marked as the bus system.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into the same electronic component or chip, or some features may be ignored or not performed.

Functional units in the embodiments of the present invention may be integrated into one processing unit, or each of the units may exist alone physically, or two or more units are integrated into one unit. The foregoing integrated unit may be implemented by hardware, software, or a combination thereof. A software program may be stored in a computer readable storage medium, and steps corresponding to the foregoing methods are performed when the program runs. The foregoing storage medium may be a ROM/RAM, a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method for an Ethernet passive optical network, the method comprising:
   obtaining link communication quality of both a first physical link and a second physical link between an optical line terminal and an optical network unit; and
   performing forward error correction (FEC) encoding on the first physical link using a first FEC code, and performing FEC encoding on the second physical link using a second FEC code, comprising forming an FEC codeword stream based on one or more Ethernet frames that use an identical FEC encoding type; performing a 66-bit conversion on a control character to generate a 66-bit control code block; and placing at least one 66-bit control code block separately at a start position and an end position of one or more continuous FEC codeword streams to form a continuous code block stream comprising one or more FEC codewords, wherein FEC encoding is performed on the 66-bit control code block using a third FEC code different from the first or the second FEC code and, wherein
   the link communication quality of the first physical link is higher than that of the second physical link, and an encoding performance of the second FEC code is higher than that of the first FEC code.

2. The communication method according to claim 1, wherein the performing FEC encoding on the first physical link using a first FEC code, and performing FEC encoding on the second physical link by using a second FEC code comprises:
   receiving an FEC request to generate the control character, wherein the FEC request comprises a first FEC encoding type or a second FEC encoding type, the control character comprises an FEC encoding type and a delimiter, the FEC encoding type is used to identify whether the first FEC code or the second FEC code is used during FEC encoding, and the delimiter is used to identify a start delimiter or an end delimiter of a particular FEC codeword stream during FEC encoding.

3. The communication method according to claim 2, wherein each FEC codeword comprises an FEC payload and a check code, and the 66-bit control code block is located before the first FEC codeword or the 66-bit control code block is located after a check block of the last FEC codeword.

4. The communication method according to claim 2, wherein the control character further comprises FEC encoding switch information used to instruct whether to perform FEC encoding.

5. The communication method according to claim 2, wherein the control character further comprises information about a length of the FEC codeword stream used to assist in identifying an FEC codeword stream in a correct length.

6. A communications device, comprising:
an obtaining unit configured to obtain link communication quality of both a first physical link and a second physical link between an optical line terminal and an optical network unit;
a first forward error correction (FEC) encoding unit configured to perform FEC encoding on the first physical link by using a first FEC code; and
a second FEC encoding unit configured to perform FEC encoding on the second physical link using a second FEC code, each of the first FEC encoding unit and the second FEC encoding unit comprising a reconciliation sublayer and a coding sublayer, wherein the reconciliation sublayer is configured to: form an FEC codeword stream based on one or more Ethernet frames that use an identical FEC encoding type, and send the FEC codeword stream to the physical coding sublayer, wherein the physical coding sublayer is configured to, perform a 66-bit conversion on a 64-bit code block of a control character to generate a 66-bit control code block, and place at least one 66-bit control code block separately at a start position and an end position of one or more continuous FEC codeword streams to form a continuous code block stream comprising one or more FEC codewords, wherein FEC encoding is performed on the 66-bit control code block using a third FEC code different from the first or the second FEC code, and wherein
the link communication quality of the first physical link is higher than that of the second physical link, and encoding performance of the second FEC code is higher than that of the first FEC code.

7. The communications device according to claim 6, wherein
the reconciliation sublayer is configured to receive an FEC request to generate the control character and send the control character to the physical coding sublayer, wherein the FEC request comprises a first FEC encoding type or a second FEC encoding type, the control character comprises an FEC encoding type and a delimiter, the FEC encoding type is used to identify whether the first FEC encoding type or the second FEC encoding type is used during FEC encoding performed by the physical coding sublayer, and the delimiter is used to identify a start delimiter or an end delimiter of a particular FEC codeword stream during FEC encoding performed by the physical coding sublayer.

8. The communications device according to claim 7, wherein each FEC codeword comprises an FEC payload and a check code, and the 66-bit control code block is located before the first FEC codeword or the 66-bit control code block is located after a check block of the last FEC codeword.

9. The communications device according to claim 7, wherein the control character further comprises FEC encoding switch information used to instruct the physical coding sublayer whether to perform FEC encoding.

10. The communications device according to claim 9, wherein the control character further comprises information about a length of an FEC codeword stream used to assist the physical coding sublayer in identifying an FEC codeword stream in a correct length.

11. The communications device according to claim 8, wherein the communications device represents the optical line terminal or the optical network unit.

12. A non-transitory computer-readable medium having instructions stored therein, which when executed by a processor, cause the processor to perform operations, the operations comprising:
obtaining link communication quality of both a first physical link and a second physical link between an optical line terminal and an optical network unit; and
performing forward error correction (FEC) encoding on the first physical link by using a first FEC code, and performing FEC encoding on the second physical link by using a second FEC code, comprising forming, at a reconciliation sublayer, and FEC codeword stream based on one or more Ethernet frames that use an identical FEC encoding type: sending the FEC codeword stream to a physical coding sublayer; performing, at the physical coding sublayer, a 66-bit conversion on a control character to generate a 66-bit control code block, and placing at least one 66-bit control code block separately at a start position and an end position of one or more continuous FEC codeword streams to form a continuous code block stream comprising one or more FEC codewords, wherein FEC encoding is performed on the 66-bit control code block using a third FEC code different from the first or the second FEC code, and wherein the link communication quality of the first physical link is higher than that of the second physical link, and encoding performance of the second FEC code is higher than that of the first FEC code.

13. The computer-readable medium according to claim 12, wherein the operations further comprise:
receiving an FEC request to generate the control character, wherein the FEC request comprises a first FEC encoding type or a second FEC encoding type, the control character comprises an FEC encoding type and a delimiter, the FEC encoding type is used to identify whether the first FEC code or the second FEC code is used during FEC encoding performed by the physical coding sublayer, and the delimiter is used to identify a start delimiter or an end delimiter of an FEC codeword stream during FEC encoding performed by the physical coding sublayer.

14. The computer-readable medium according to claim 13, wherein the operations are performed on the optical line terminal or the optical network unit.

15. The computer-readable medium according to claim 13, wherein each FEC codeword comprises an FEC payload and a check code, and the 66-bit control code block is located before the first FEC codeword or the 66-bit control code block is located after a check block of the last FEC codeword.

16. The computer-readable medium according to claim 13, wherein the control character further comprises FEC encoding switch information used to instruct the physical coding sublayer whether to perform FEC encoding.

17. The computer-readable medium according to claim 16, wherein the control character further comprises information about a length of an FEC codeword stream used to assist the physical coding sublayer in identifying an FEC codeword stream in a correct length.

* * * * *